Oct. 27, 1964  M. KORALEWSKI  3,154,220

DUAL SALT AND PEPPER SHAKER

Filed March 19, 1962

INVENTOR.
MITCHELL KORALEWSKI
BY
WILSON, SETTLE & CRAIG
ATTORNEYS

3,154,220
DUAL SALT AND PEPPER SHAKER
Mitchell Koralewski, 6839 Winthrop Ave., Detroit 28, Mich.
Filed Mar. 19, 1962, Ser. No. 180,661
3 Claims. (Cl. 222—142.4)

This invention relates to an improved condiment holder, and more particularly to a dual salt and pepper shaker wherein the salt and pepper comparments are placed one above the other in a hollow vertically disposed container, and wherein a novel baffle and valve arrangement provide automatic dispensing of either condiment separately.

In the prior art, as in well known, salt and pepper are commonly provided for use in individual containers inasmuch as the prior efforts to provide dual units have not presented sufficient utility or dependability of operation to meet public demand. The desirability of a single unit to provide both condiments is believed to be self-evident as regards both convenience and the advantage of less storage space.

It would accordingly provide a step forward in the art if a unitary salt and pepper shaker could be provided wherein both condiments were readily available and wherein the use of one automatically prevented use or loss or spilling of the other.

It is accordingly an important object of the present invention to provide a dual salt and pepper shaker.

A further object of the present invention is to provide a dual salt and pepper shaker wherein the condiment compartments thereof are provided in stacked vertical array and wherein each of the ingredients can be dispensed separately in an automatic manner.

It is a further object to provide a dual salt and pepper shaker wherein a separable elongated hollow or tubular container is provided with a medial wall forming an upper salt dispensing compartment and a lower pepper dispensing compartment with automatic metering means providing for the use of either compartment without spillage from the other.

A further object is to provide a unique salt and pepper shaker of vertical hollow disposition wherein lifting of the device and shaking in its normal upright position is effective to actuate an automatic valve in the bottom compartment to provide release of that ingredient and a baffle arrangement in the top compartment prevents loss of that ingredient, and whereby inversion of the container provides for dispensing of the top ingredient around the baffle and automatically closes the valve in the bottom compartment to prevent loss of that ingredient.

Other objects of this invention will appear in the following description and appended claims, reference being had to the accompanying drawings forming a part of this specification wherein like reference characters designate corresponding parts in the several views.

Before explaining the present invention in detail it is to be understood that the invention is not limited to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

PERSPECTIVE VIEW

Briefly, the present invention encompasses a dual salt and pepper shaker wherein the body of the unit is a generally elongated hollow structure that is vertically disposed and having a medial separating wall for an upper salt cavity in the top. Salt dispensing holes and an anti-loss baffle are provided in the top. The lower portion of the unit comprises a hollow compartment adapted to contain pepper, and with a unique valve in the bottom thereof. Upon picking the unit up off a supporting surface and shaking it in its normal vertical position, the valve in the bottom of the pepper compartment is caused to be moved to release the pepper during up-and-down movement and the anti-loss baffle in the upper salt compartment prevents loss of salt by virtue of the fact that the salt which may be thrown upwardly toward the top is deflected by the tortuous path created by the baffle and prevented from being lost.

When the unit is inverted, the salt will flow around the anti-loss baffle and be dispensed through the feed or distribution holes upon application of a shaking motion; however, the inverting movement causes the pepper valve to reverse to an over-center, closed position by gravity movement, and because of the weight built thereinto, is retained in such position even in the presence of a shaking movement, to prevent loss of pepper.

Advantage is taken in the present invention of gravity for holding the condiment not being dispensed in the bottom of its retaining cavity and thus away from its dispensing aperture. This pull of gravity, in combination with the anti-loss characteristic of either the baffle or the pepper valve, provides double protection against loss of the condiment not being dispensed. Thus, in the normal vertical position of the device, the salt is retained at the bottom of its cavity and away from the dispensing apertures and any small amount that is thrown upwardly toward the dispensing apertures is prevented from loss by the baffle. Conversely, when the unit is inverted for dispensing salt, the pepper drops downwardly to the bottom of its compartment and thus is retained in spaced relation away from its dispensing valve, and any pepper that may be accidentally thrown upwardly toward the valve is prevented from loss by the automatic pepper valve.

In view of this brief description, the manner in which these various elements cooperate will now be brought forth in complete detail in the following description.

THE INVENTION

General Arrangement

Figure 1:
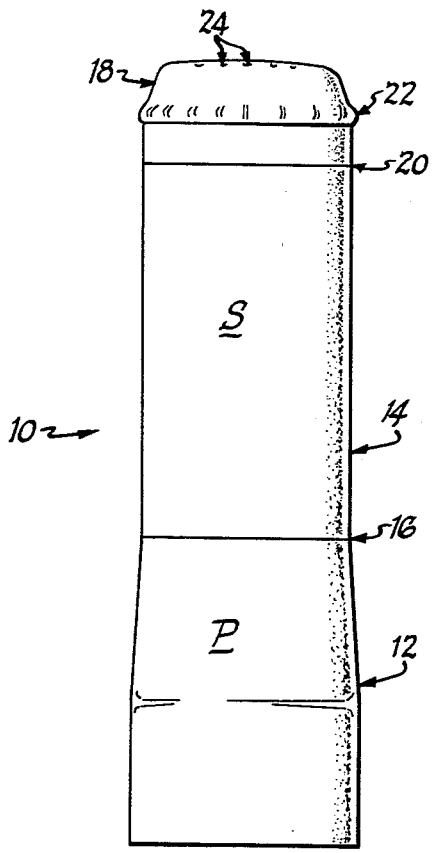
FIGURE 1 is a front elevational view of a dual salt and pepper shaker made in accordance with the present invention.

As shown in FIGURE 1, the salt and pepper shaker of the present invention is designated by the numeral 10, and includes a base portion 12 defining a lower pepper compartment, a medial portion 14 defining a salt compartment, and with a parting line 16 therebetween. Atop the unit is a dome-like cap 18 connected as by screw fitting to the top of medial portion 14 at a parting line 20, and having a knurled handle portion 22 for application and removal by turning to join it to the remainder of the unit.

As shown at 24 a plurality of salt-dispensing holes is provided, this being the visible indication that the device is a dispenser. Thus, the aesthetic value of the present device is characterized by clean lines of modern design.

The Interior Construction

Figure 2:
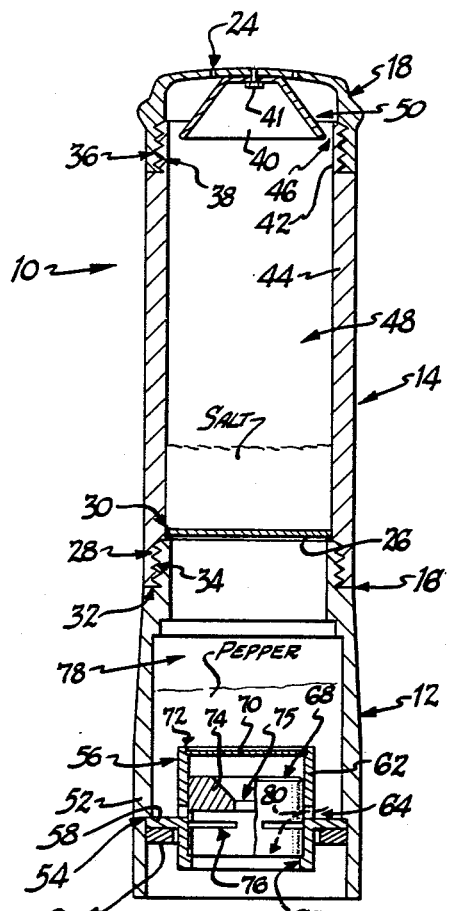
FIGURE 2 is a longitudinal section view of FIGURE 1.

As shown in FIGURE 2, the unit is divided medially by a dividing wall 26, positioned just above the parting line 16, at the top of the threaded portion 28. It will be noted that a shoulder 30 is provided at the top of the thread 28 and the separating wall 26 is press fitted thereagainst. The separating wall 26 is suitably a circular disc of flat sheet material. It will be noted that the top end of the base portion 12 is shouldered at 32 and threaded at 34 for separable joinder to the medial portion 14. The structure shown is of generally tubular configuration and for joinder purposes, round threaded portions of inter-engaging relationship are provided to effect the joinder. However, the external configuration of the unit is not limited to a round configuration and may be hexagonal, square or other suitable or desirable aesthetic shape.

The Top

As shown in FIGURE 2, the dome-like cap or top 18 is internally threaded at 36 to mate with an external thread at 38 formed at the top of the medial portion 14; the salt-dispensing holes are shown at 24.

Beneath the dome-like cap 18 there is provided a frusto-conical salt retaining baffle 40, suitably by a small screw 41, run through the baffle and into top 18. It will be noted that this baffle 40 has the perimeter thereof extending close to the inside surface 42 of wall 44 of medial portion 14. Thus, an annular passage 46 is provided between the periphery of the baffle 40 and the interior 42 of the wall 44. Since the periphery of the baffle 40 lies radially outwardly of the ring of salt dispensing holes 24, it will be noted that the salt must follow a tortuous path in traveling from the cavity 48 to the exterior of the device. It will be understood however that this is readily effected when the device is inverted and shaking motion is applied thereto; thus, the salt can readily flow through the gap 46 into the space 50 above the baffle 40 and through the holes 24 and out of the unit.

Alternate Baffle

An alternate embodiment of the salt retaining baffle 40 could take the form of a perforated plate wherein the perforations are misaligned relative to the perforations in the cap to provide a tortuous path of travel for the salt. Thus the salt will not be able to traverse such path when the unit is upright and will be retained against loss.

The Automatic Pepper Valve

As shown at the bottom of FIGURE 2, the wall 52 of the base portion 12 is provided with a shoulder as at 54, and a valve body designated by the numeral 56 has an annular flange 58 thereof positioned thereagainst at its outer periphery. A ring 60 is press fitted against flange 58 to retain the valve body 56 in position closing the bottom of base portion 12.

The valve body 56 is of generally tubular configuration, being defined by a generally tubular wall 62 that is provided with a ring of apertures 64, formed just above or along the top surface of the annular flange 58. Within the extended scope of invention these apertures 64 can take the form of slots, as in the movable valve element to be later described.

As indicated at 66, valve wall 62 is provided with a shoulder to retain a movable valve element 68, which is of circular configuration and adapted to slide inside wall 62. After the valve element 68 is inserted, a cap 70 is snap fitted in against a shoulder 72.

It will be noted that the movable valve element 68 is of tubular configuration and has a relatively heavy disc-like top 74 to add substantial mass and weight and thus inertia thereto. The top is provided with a vacuum breaker hole 75. At 76, it will be noted that a ring of apertures or slots is provided around the movable valve element 68 beneath the top 74. By up and down shaking motion to the unit 10, the valve 68 is caused to slide up and down within the wall 62 and as the slot or aperture 76 thereof passes the aperture ring 64 of the valve body 66, pepper can move therethrough. It will be noted that the movement of valve 68 is sufficient to carry slot or aperture 76 of element 68 below and above the aperture ring 64. Thus, the valve is closed on each end. Thus, it is closed when the unit is sitting in its normal position, preventing the flow of pepper out of the unit. Also, when the unit is inverted, the valve 68 goes over center the other direction and similarly prevents the pepper from being lost with the additional helping factor of gravity pulling the pepper downwardly to the bottom of the pepper retaining cavity 78 that is to the other end of the compartment from that shown. These two factors effectively prevent loss of pepper in the inverted position of the unit. However, with the unit right side up and during up and down shaking motion of the unit, the aperture ring 76 passes up and down relative to the aperture ring 64 in a pumping motion to dispense pepper from the unit when it is available in the aperture ring 64 by downward gravity flow.

Alternate Top Construction

Figure 3:
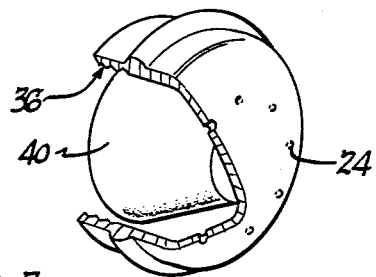
FIGURE 3 is an isometric view, partly in section, showing an alternate configuration for the salt dispensing holes in the top of the unit.

As shown in FIGURE 3, the salt dispensing holes 24 can be slanted as indicated inwardly toward the axis of the unit to provide a more tortuous path and a still more effective retention of salt against loss during upright pepper dispensing. According to a specific embodiment of this alternate construction, 12 holes, canted at about 30° to the plane of location of about 3/64" diameter were arranged in a circle of 13/16" diameter.

Figure 4:
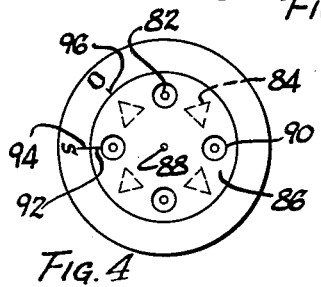
FIGURE 4 is a plan view of a modified cap structure encompassed within the scope of the invention.

Also, it is to be included within the scope of the invention to provide a cap modification as shown in FIGURE 4. Thus, the dome-like cap 18, instead of the circular pattern of salt dispensing holes 24, is provided with two sets of holes of different size; thus, one set of holes comprises small circular apertures 82, spaced in circular array and 90° apart. In between these holes 82 are positioned larger openings 84, typified by triangular shape for emphasis of different size and flow capacity. Over the two hole patterns 82–84, there is provided a covering cap 86, that snugs to the top contour of the cap 18 and is rotatably mounted on a pin 88. The close fit between the top surface of the top 18 and the bottom side of the covering cap 86 prevents loss of material through the covered openings. The covering cap 86 is provided with a 90° spaced set of large holes 90 that are alignable with either set of holes 82–84. As shown, the holes 90 are positioned over the holes 82 for feeding a fairly fine granular material such as crystalline salt. However, in the event that it is desirable to dispense a material such as paprika, a cinnamon-sugar mixture, or the like, from the upper cavity, the covering cap 86 is rotated 45° to align the openings 90 with the openings 84 and provide for feeding coarser materials.

This provides a further advantage in the uniqueness and adaptability of the present invention and accordingly extends the versatility and usefulness of the invention.

To identify the materials which are contained within the normal novel condiment dispenser of the present invention, the letter "S" may be formed into the medial portion 14 as indicated in FIGURE 1 and the letter "P" designating pepper, formed into the material of the base portion 12.

Still further, if desired, an index mark 92 may be formed on the covering cap 86 that is alignable with an index mark 94 opposite the letter "S" to designate a salt setting. The index mark 92 is also alignable with the index mark 96 opposite the letter "O" designating other ingredients than salt to be dispensed. This adds to the aesthetic appeal and utility of the present invention.

Summary of Operation

From the foregoing it will be understood that when the device is in its normal storage or standing position, as indicated in the figures of the drawings, salt will be at the bottom of the compartment 48 and pepper will be at the bottom of the compartment 78. It is obvious that there is no danger of the salt being lost because gravity pulls it away from the dispensing apertures 24. However, without the benefit of movable valve 68 the pepper would be lost. Yet this is prevented by the fact that the movable valve 68 moves the dispensing ports 76 over center and below the ports 64 of the valve body 66 to close the unit and prevent loss of pepper. Now presuming that a person desires to dispense pepper, he merely shakes the unit in an up and down manner, causing the valve 68 to be moved up and down and pump pepper out through the ports 64–76 in the arrow 80 direction. During this shaking operation, the salt has a tendency to lie in the bottom of the cavity 48 and thus stay away from the dispensing ports 24. However, should the shaking be sufficiently violent to throw the salt upwardly toward the dispensing ports 24, the deflecting baffle 40 providing a tortuous path to the holes 24, prevents salt loss.

Thus, pepper is dispensed by holding the unit in its normal upright position and shaking.

To dispense salt, the unit is merely inverted and the salt follows the tortuous path by gravity to the holes 24 when a gentle shaking action is applied. When the unit is inverted, the pepper also falls away from the valve 56–68 and this plus the fact that the valve 68 goes over center to close the port 64, the pepper is effectively retained against loss.

Extended Scope of Invention

While the invention has been described with relation to the pepper in the bottom compartment and salt in the top, this is not to be considered as limiting on the invention. This is preferable however because pepper is less likely to clog the bottom valve due to its fineness of grind or small grain size than would crystalline salt. However, when pulverized salt is employed, or when sufficient clearances are provided in the construction of valve 56–58, either pulverized or crystalline granular salt could be employed in the bottom compartment and the pepper dispensed from the top.

Materials of Construction

The dual salt and pepper shaker incorporating the principles of the present invention can suitably be made of the wide variety of materials. Thus, the body portion can be made of wood, aluminum or other metals which can be turned and formed. Also, it will be evident that the construction can be of plastics of various kinds. For high production low cost items the latter material may be quite desirable. Also, a broad range of materials can be used to make the cap and the salt retaining baffle 40, as well as the valve body 56 and the retainer ring 60. However, as regards the movable valve member 68, this will preferably be made of material of sufficient mass to provide enough pull by gravity to overcome slight pressure which may be provided by a body of pepper in the lower compartment and thus effectively close the ports 64. In one embodiment of the invention, this valve element was made of steel, stainless varieties preferred, to resist corrosion and clogging; however, other metals of substantial specfic gravity and easy machining can be used. In some instances it may be possible to form the valve body 68 of a plastic and imbed a metal washer or ring, for weight, in the top of the unit.

Advantages of the Present Invention

From the foregoing it will be understood that a novel dual salt and pepper shaker of improved convenience is provide. Thus, a user need have only one convenient and stylish item for dispensing both salt and pepper separately. Further, the dual salt and pepper shaker of the present invention is entirely automatic in its operation, as distinguished from the units of the prior art requiring manual movement of a control valve to dispense a desired condiment. Thus, in the present invention when the unit is merely picked up and shaken, a desired ingredient can be dispensed while automatically locking the other ingredient against loss.

Additionally, a unit of aesthetic value is provided that will contribute to the decor of a table upon which it is placed, and further provides the advantage that very little table space is required, namely one half of that of two conventional salt and pepper shakers of equivalent capacity as now known in the art.

Having thus described my invention, I claim:

1. In a dispenser for granular materials, a hollow elongated body member having a top end and a base end, a transverse wall between said ends dividing said body into separate, upper and lower container compartments, a top detachably connected to said top end, a plurality of dispensing apertures in said top, a deflecting shield positioned in spaced relation beneath said top and overlying said holes in tortuous path forming manner, a tubular valve wall secured in said base and having a dispensing aperture therein, a tubular valve member slidable within said valve wall and having an aperture therein that is adapted to cross over said dispensing aperture upon sliding movement thereof, and means for retaining said valve member in slidable relation within said tubular valve wall.

2. In a dispenser for granular materials, an elongated body having a top and a base defining separate cavities adjacent said top and base, a cap member detachably connected to said top, a dispensing aperture in said cap, a shield member positioned beneath the underside of said cap and having a portion spaced from said cap to define a tortuous path with said dispensing aperture, a valve secured within said body adjacent said base, said valve including a tubular wall having a peripherally extending annular flange, means connecting said flange to said body member, a radially extending dispensing aperture in said tubular wall interiorly of said annular flange, a tubular valve member slidable in said tubular wall and having a radially extending dispensing aperture therein, means establishing the length of movement of said valve member, and said radially extending dispensing aperture being alignable with said tubular wall aperture approximately half way along the path of movement thereof.

3. In a dispenser for granular materials,
 a tubular body defining axially spaced cavities separated by a transverse, medial wall,
 a cap connection to one end of said tubular body,
 first and second dispensing apertures in said cap and of differing size and configuration,
 a rotatable shield mounted on top of said cap,
 a dispensing aperture in said cap alignable with one or the other of said first and second dispensing apertures upon rotation of said shield,
 a baffle supported in spaced relation beneath said cap and having a passage therethrough staggered relative to said prior defined apertures and defining a tortuous path with said dispensing apertures, and a valve at the other end of said unit, comprising a tubular valve wall supported in axial alignment within said tubular body, said tubular valve wall having a first radially extending dispensing opening therein, a tubular valve member slidable within said valve wall and having a second radial aperture therein adapted to cross over said first radial aperture upon sliding movement of the valve member, and means retaining said valve member in slidable relation within said tubular valve wall.

References Cited in the file of this patent

UNITED STATES PATENTS

| 748,329 | Williamson | Dec. 29, 1903 |
| 968,890 | Sprinkle | Aug. 30, 1910 |
| 1,898,152 | Taft et al. | Feb. 21, 1933 |
| 2,035,256 | Ball | Mar. 24, 1936 |

FOREIGN PATENTS

| 9,143 | Austria | Sept. 25, 1902 |
| 27,692 | Great Britain | Dec. 19, 1904 |
| 549,469 | Germany | Apr. 28, 1932 |
| 652,976 | Germany | Nov. 10, 1937 |